Sept. 7, 1943.　　　　　S. SCHNELL　　　　　2,328,684
BRAKING SYSTEM
Filed Feb. 19, 1942　　　2 Sheets-Sheet 1
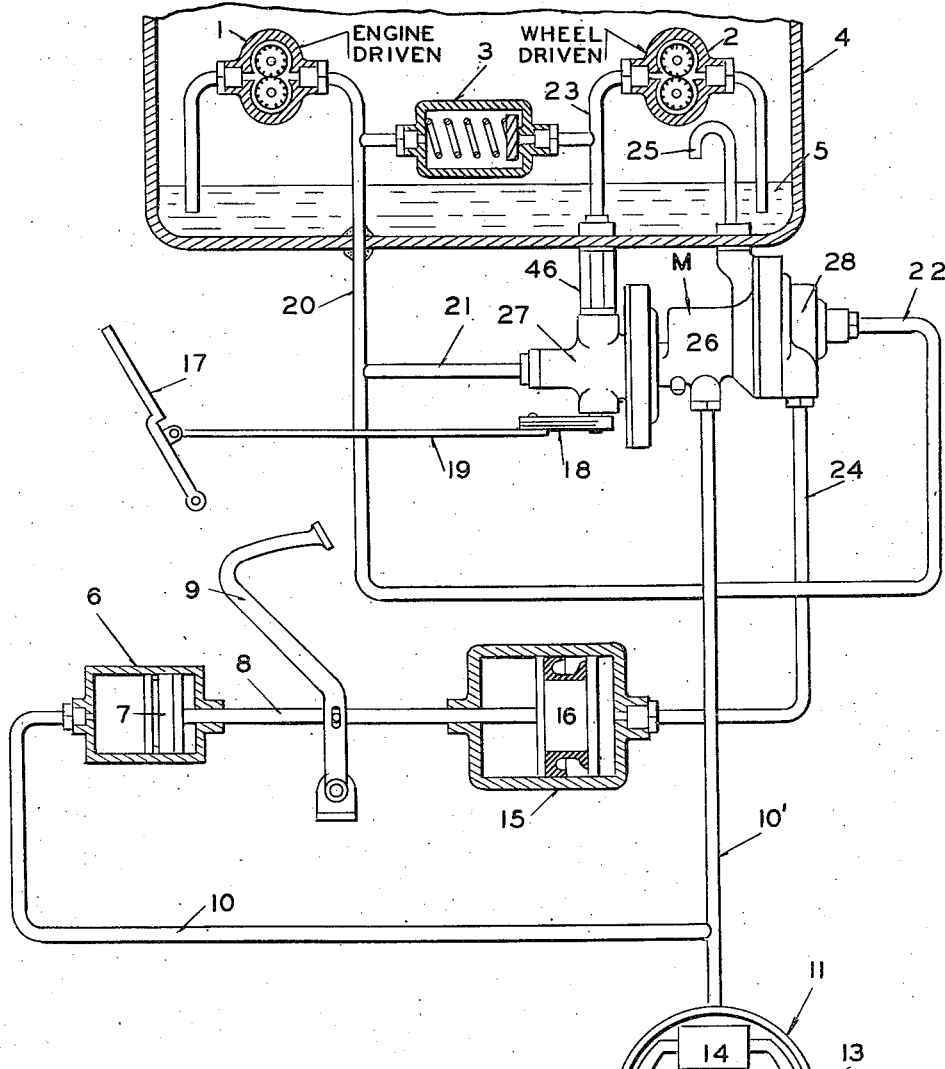
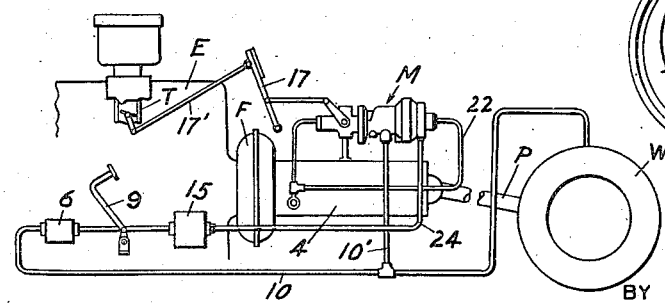
INVENTOR
STEVE SCHNELL
ATTORNEY Sept. 7, 1943.  S. SCHNELL  2,328,684
BRAKING SYSTEM
Filed Feb. 19, 1942  2 Sheets-Sheet 2
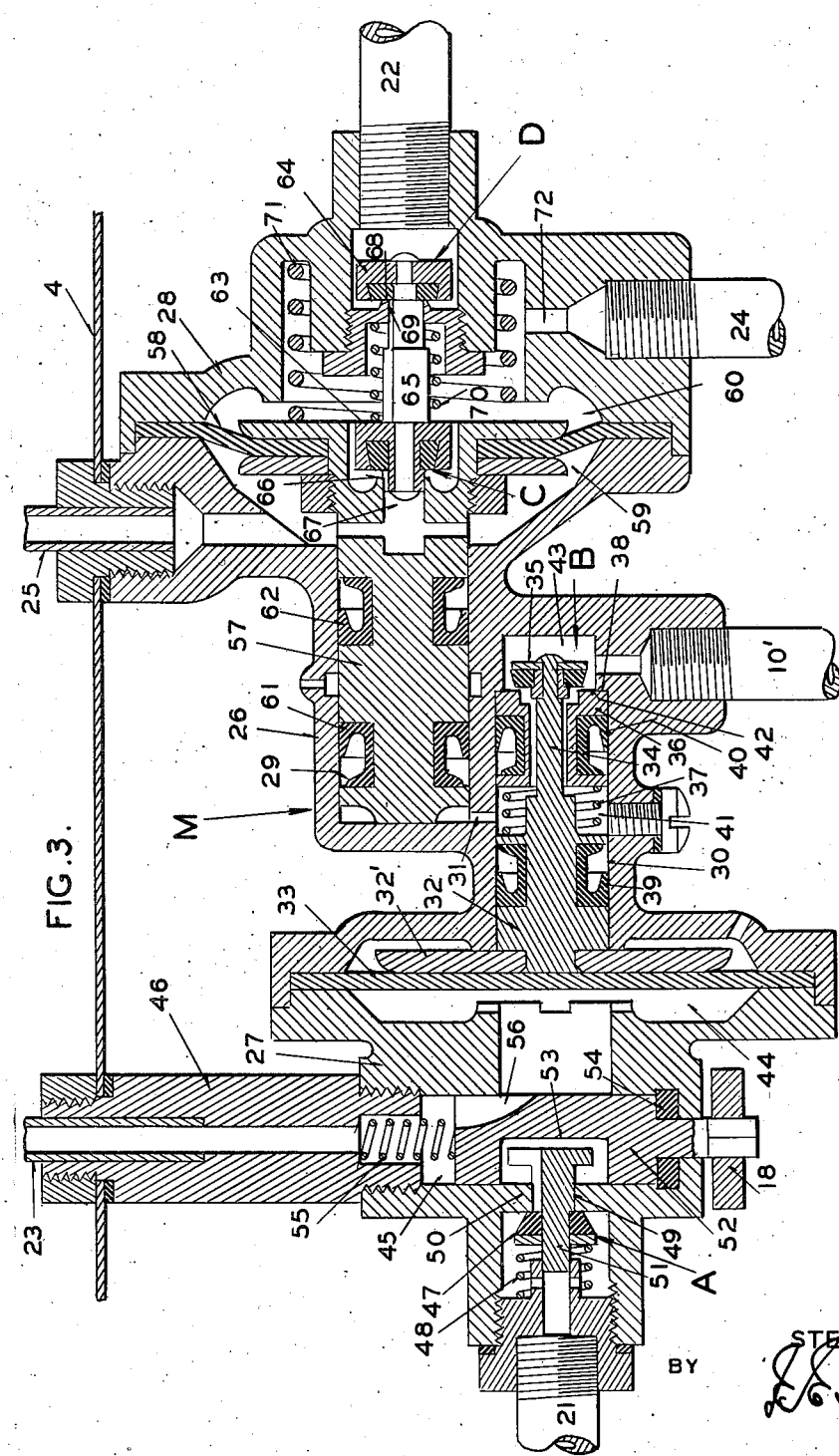

Patented Sept. 7, 1943

2,328,684

UNITED STATES PATENT OFFICE 2,328,684

BRAKING SYSTEM

Steve Schnell, Kirkwood, Mo., assignor to Wagner Electric Corporation, St. Louis, Mo., a corporation of Delaware Application February 19, 1942, Serial No. 431,487

19 Claims. (Cl. 192—3)

My invention relates to braking systems for vehicles and more particularly to a braking system to be employed in conjunction with fluid pressure pumps at least one of which is driven by the engine of the vehicle and another is driven only when the vehicle is moving.

One of the objects of my invention is to provide an improved fluid pressure operated booster for a vehicle braking system which derives its fluid pressure from either a pump driven by the engine of the vehicle or from a pump driven when the vehicle is moving.

Another object of my invention is to provide a vehicle with a braking system having improved means for automatically holding the brakes applied when the vehicle is brought to a stop with the motor running and the accelerator mechanism in released condition, said brake holding means deriving its power from a pump driven by the engine.

Yet another object of my invention is to provide an improved braking system for use with a vehicle provided with an automatic transmission embodying speed changing control means having a pump driven by the engine and a second pump driven in accordance with movement of the vehicle and also embodying a fluid coupling causing "creeping" of the vehicle when stopped on a level roadway without the brakes being applied, said improved braking system permitting the brakes to be automatically held applied if applied when the vehicle is stopped and also establishing a booster to aid manual application of the brakes when they are used for service purposes.

Other objects of my invention will become apparent from the following description taken in connection with the accompanying drawings in which Figure 1 is a schematic view of a braking system embodying my invention, said view showing the braking system associated with certain parts of a vehicle; Figure 2 is an enlarged schematic view of the braking system; and Figure 3 is a sectional view of the valve mechanism for said braking system.

Referring to the drawings in detail and particularly Figures 1 and 2, the improved braking system is shown associated with an automatic transmission which is known as a "Hydramatic" transmission. The only parts of this transmission shown in Figure 2 are the gear pumps 1 and 2 and the one-way valve connection 3. These parts, as diagrammatically shown, are situated within the transmission casing 4 which contains the sump 5 for the liquid circulated by the pumps. The pump 1 is connected to the engine E to be constantly driven thereby when the engine is operating. The pump 2 is connected to the propeller shaft P or some other rotatable member which is connected to be rotatable simultaneously with the movement of the wheels W of the vehicle. When the vehicle is stopped, the fluid coupling F permits the engine to idle without driving the wheels due to the slip of the coupling. This slip, however, does tend to cause the vehicle to "creep" on a level or descending roadway but this is prevented by application of the vehicle brakes. The check valve 3 prevents fluid under pressure from pump 1 from entering the system which is connected to pump 2 but does not prevent pump 2 from forcing fluid under pressure to the system connected to the pump 1 whenever said last named pump is not operating.

Although I have shown my braking system associated with a particular type of automatic transmission in which pumps 1 and 2 already form a part thereof, it is to be understood that if these pumps are not being employed on the vehicle, they may be added if it is desired to use the particular braking system on a vehicle which is not so equipped with such pumps.

The braking system shown is of the hydraulic type, having a master cylinder 6 in which the piston 7 is actuated by a piston rod 8 and a pedal 9. A conduit 10 leads from the master cylinder to the brake assemblies 11 on wheels W (one only being shown). The brake shoes 12 of each assembly are adapted to be engaged with the drum 13 by a fluid motor 14 to which the conduit 10 is connected.

In addition to pedal 9 for actuating the brakes there is provided a booster fluid motor 15, the piston 16 of which is connected to a portion of piston rod 8 extending beyond its connection with pedal 9. This booster fluid motor is adapted to be actuated by fluid under pressure from either of the pumps and in order that the fluid pressure from said pumps may be properly controlled, I have provided the control valve mechanism generally indicated by the letter M. This valve mechanism is mounted on the side of the transmission casing 4 and is connected to have certain of its parts manually controllable in accordance with the position of the accelerator pedal 17 which is connected to a valve actuating lever 18 by a rod 19. The accelerator pedal controls the throttle valve mechanism T of the engine through a connection 17 in a well-known manner. Opposite ends of the valve mechanism M are connected with pump 1 by a conduit 20 and branch conduits 21 and 22. Another conduit 23 connects the valve mechanism with the other pump 2. A branch conduit 10' leads from conduit 10 of the braking system to the valve mechanism in order that certain parts of said mechanism can be controlled by fluid pressure developed by the master cylinder. A conduit 24 leads from the valve mechanism to the booster fluid motor 15 and still another conduit 25 leads back into the sump for the return of fluid thereto.

The detailed construction of the control valve mechanism M is shown in the enlarged sectional view of Figure 3. Referring now to this figure, the valve body comprises a central casing section 26 and end sections 27 and 28 in which are positioned four valves generally indicated by the letters A, B, C and D.

The central casing section is provided with parallel bores 29 and 30 communicating with each other by a passage 31. Within one end of the bore 30 is a piston 32 which is engaged by a diaphragm 33 clamped between the casing sections 26 and 27. Piston 32 is provided with a projection 34 and on the end thereof is a valve element 35 forming part of the valve B. This projection 34 extends through an annular piston 36 also mounted in bore 30 and spaced axially from piston 32. A spring 37 is interposed between the two pistons and normally biases the piston 36 against a shoulder 38 and piston 32 against the diaphragm. The pistons 32 and 36 are provided, respectively, with packing elements 39 and 40 which are so positioned as to seal fluid in the chamber 41 formed between the two pistons, this chamber being in constant communication with the previously referred to conduit 31 between the two bores. The piston 36 is provided with a valve seat 42 for cooperation with the valve element 35 and when said valve element is seated, communication is cut off between chamber 41 and a chamber 43 at the end of bore 30 beyond shoulder 38. This latter chamber 43 communicates with the branch conduit 10' leading from conduit 10 between the master cylinder and the fluid motor of the brake assembly. The valve B formed by the valve element 35 and seat 42 is opened whenever the piston 32 and the diaphragm are moved as far to the right as permitted by the engagement of flange 32' on piston 32 with the casing section 26.

The end casing section 27, together with diaphragm 33, forms a chamber 44 which is in constant communication with conduit 23 (leading from pump 2) by way of a cross-bore 45 and tubular fitting 46, said fitting serving as a portion of the attaching means between the transmission casing 4 and the casing section 27. With this connection between pump 2 and chamber 44, the diaphragm will always maintain piston 32 in its extreme right-hand position as long as pump 2 is operating which it will be whenever the vehicle is moving.

The cross-bore 45 also communicates with the branch conduit 21 leading from the engine driven pump 1 but only under certain conditions. To control these conditions the valve A is provided which comprises a valve element 47 biased by a spring 48 to close an opening 49 in a wall 50 between the cross-bore 45 and branch conduit 21. The valve element 47 is mounted on a fluted stem 51 which extends through the opening 49 into the cross-bore. The valve can be unseated against the force of the spring whenever the valve stem is moved to the left. The means for moving this valve stem comprises a shaft 52 journaled in the cross-bore 45 and having a cam surface 53 for engaging the end of the stem. The shaft extends to the exterior of the housing and has secured thereto the previously mentioned arm 18 which is connected to the accelerator pedal 17. The shaft is sealed by a packing 54 which is held under pressure by a spring 55 acting on the inner end of the shaft. In order that fluid may flow past the shaft, it is provided with a cut-away portion 56. The valve A is normally closed whenever the accelerator is in released position and is held open by a rotation of the shaft whenever the accelerator pedal is depressed. Thus it is seen that pump 1 cannot communicate with chamber 44 of the diaphragm except when the accelerator pedal is depressed.

The bore 29 of the central casing section has mounted therein a piston 57, the outer end of which is connected to a diaphragm 58 clamped between the central casing section 26 and the end casing section 28 and providing chambers 59 and 60 on opposite sides of said diaphragm. The piston 57 carries suitably positioned sealing elements 61 and 62 for preventing flow of fluid in either direction past the piston. The piston 57 can be acted upon by fluid under pressure entering behind the piston from the previously referred to chamber 41 by way of passage 31. The chamber 59 forward of piston 57 communicates with conduit 25 leading to the sump in the transmission casing 4.

The valves C and D are adapted to be controlled by the movement of the diaphragm 58. Valve element 63 of the valve C and valve element 64 of valve D are secured to opposite ends of a stem 65. The valve element 63 cooperates with a valve seat 66 associated with a passage 67 in the end of the portion of the piston to which diaphragm 58 is connected, said passage 67 establishing communication between chambers 59 and 60 on opposite sides of the diaphragm whenever the valve element 63 is unseated. The valve element 64 of valve D cooperates with a valve seat 68 of a passage 69 which permits the branch conduit 22 leading from pump 1 to communicate with chamber 60. The valve element 64 is normally held seated by a spring 70 which cooperates with the valve stem 65. Another spring 71 acts on the diaphragm and normally holds the diaphragm and the piston 57 in their extreme left positions where piston 57 abuts the end of bore 29 and valve element 63 is unseated and valve element 64 is held seated. The chamber 60 is provided with an outlet passage 72 which places said chamber in communication with conduit 24 leading to the booster fluid motor 15.

By the arrangement of the valves C and D just described it is seen that both valves can be closed simultaneously and that valve C will be open when the valve D is closed and that valve C will be closed when valve D is open. When valve C is open, the booster fluid motor will be in communication with the sump since the chambers on opposite sides of the diaphragm are in communication with each other. When valve D is open, conduit 22 will be placed in communication with conduit 24 and thus pump 1 can communicate with the booster fluid motor 15 to produce a force on the master cylinder piston to aid the manual force being placed thereon by the brake pedal or to maintain the master cylinder piston in brake applying position in the event the operator's foot is removed from the pedal.

Referring now to the operation of the braking system, the parts of the valve mechanism will be in their positions shown in Figure 3 whenever the vehicle is stopped and the motor is not running, with the exception that valve B will be closed under the action of spring 37 moving piston 32 to the left. Neither pump is operating so there is no fluid pressure being developed thereby. If the operator should now start the engine, pump 1 will begin to operate and develop pressure. The value of this pressure may be taken, for example, as about eighty pounds per square inch. This pressure will be developed as soon as the engine begins to turn over. Fluid under pressure from pump 1 cannot pass to pump 2 or conduit 10' leading therefrom because of the check valve 3. The pump, however, can force fluid under pressure into conduit 20 and the branch conduits 21 and 22. Since valve D is closed, fluid under pressure cannot pass out of conduit 22. It will, however, pass out of conduit 21 in the event the accelerator pedal is depressed and valve A is opened. Such a condition would prevail since the accelerator pedal is generally depressed in starting the engine. When valve A is open, fluid under pressure can enter chamber 44 and act on diaphragm 33. This causes piston 32 to be moved to the right, thereby opening valve B.

If the braking system is associated with a "Hydramatic" transmission, the vehicle will tend to "creep" due to the fact that in such a transmission there is associated with the transmission the fluid coupling F of the Föttinger type. This tendency of the vehicle to "creep" will cause the operator of the vehicle to immediately depress the brake pedal if the ordinary parking brake of the vehicle is not applied to prevent the "creeping." When the brake pedal is depressed, the accelerator pedal will be released and the brakes will be applied by the fluid pressure developed by the master cylinder. Also, fluid under pressure will be forced through conduit 10' into chambers 43 and 41. Fluid under pressure will also enter the rear end of the bore 29 by way of passage 31 and move piston 57 to the right. This movement of piston 57 will close valve C and open valve D. As soon as valve D is open, fluid under pressure from the branch conduit 22 will be admitted to chamber 60 and conduit 24 which leads to the fluid motor booster 15. The booster piston will then act on the master cylinder piston and be effective to hold the brakes applied. The foot can then be removed from the brake pedal without releasing the brakes. The fluid pressure from pump 1, which enters chamber 60 upon the opening of valve D will not be effective to move the diaphragm to the left and cause the closing of valve D and the opening of valve C because the fluid under pressure will be trapped in bore 29 behind piston 57. This trapping of the fluid is caused by the fluid under pressure entering chamber 41 and causing piston 32 to move to the left, thereby closing valve B. The diaphragm 33 will be permitted to move to the left and permit valve B to close since the accelerator pedal has been returned to the released position, thereby resulting in valve A being closed. When valve A is closed, the fluid under pressure in chamber 44 acting on diaphragm 33 will drop quite quickly to zero due to the leakage through the gears of pump 2 which is not operating due to the fact that the vehicle is stopped. It is thus seen that the brakes will be held applied by the fluid pressure being developed by pump 1 and will remain in such condition as long as the accelerator pedal is not depressed.

When the vehicle is ready to be started, the accelerator pedal is depressed, thereby opening valve A. Fluid under pressure from pump 1 will again enter chamber 44 and move diaphragm 33 to the right carrying with it piston 32 and opening valve B. As soon as the vehicle starts, pump 2 will immediately come into action and constantly maintain a pressure in chamber 44 to thus hold the valve B open, notwithstanding the fact that the valve A may be closed as a result of releasing the accelerator pedal. When valve B is held open, fluid under pressure will no longer be trapped in chamber 41 and at the rear of piston 57. The fluid under pressure in chamber 60 at the right side of diaphragm 58 will now move piston 57 to the left. It is to be noted that the diaphragm 58 has a considerably greater area than piston 57 and thus with the pressure being developed by pump 1, piston 57 can be moved even though opposed by the fluid pressure in chamber 41 and the brakes. As soon as the diaphragm 58 moves to the left, valve D will be closed and valve C opened. The fluid pressure from pump 1 will thus be cut off from the booster and the booster connected to the sump, thereby permitting the release of the brakes.

When the vehicle is moving and it is desired to apply the brakes, the brake pedal will be operated to manually develop fluid pressure by the master cylinder. The fluid pressure developed by the master cylinder will also act to move piston 57 to the right, thereby closing valve C and opening valve D. The fluid pressure will not be trapped behind piston 57 under these conditions since valve B will not be closed due to the pressure in chamber 44. The size of piston 32 is such that the pressure developed by the master cylinder to apply the brakes will not be great enough to move piston 32 against the pressure acting on diaphragm 33 and developed by pump 2 when the vehicle is moving. When valve D is open, fluid pressure will be established in the booster fluid motor. As the fluid pressure in the booster and chamber 60 builds up, it will act on diaphragm 58 and move it to the left until valve D is closed. The diaphragm 58 can be moved against the fluid in bore 29 and chamber 41 since this fluid is not trapped due to valve B being open. This metering action of valve D will continue until the pressure in bore 29 created by operation of the brake pedal is so great that the pump pressure cannot move diaphragm 58, at which time valve D will remain open. Thus it is seen that when the brakes are applied to bring the vehicle to a stop, there is an added force applied to the master cylinder by the booster fluid motor which will assist the operator in applying the brakes and relieve him of some manual effort. The booster force will be proportional to the manual effort due to the metering action of valve D.

When the vehicle is brought to a stop, pump 2 will cease operating and if the accelerator pedal is released and the brakes applied by moving the foot pedal, the brakes will be maintained applied when the foot is removed from the brake pedal. The amount of pressure held applied in the braking system, however, will be determined by the fluid pressure acting on piston 16 of the booster fluid motor. When the vehicle is stopped, fluid pressure will again be trapped at the rear of piston 57 and the valve C maintained closed and valve D open so that pump 1 can apply pressure to the piston of the booster fluid motor. As long as the engine is running when the vehicle is stopped, the brakes, if applied, will be maintained applied without manual effort. Thus there is no necessity to hold the foot on the brake pedal to prevent "creeping" of the vehicle. When it is again desired to start the vehicle, the brakes will be released by merely depressing the accelerator pedal.

It is to be noted that even though the engine should be dead when the vehicle is moving, the operation of pump 2 will, nevertheless, cause the booster fluid motor to be operated. Under these conditions the fluid pressure from pump 2 will pass through check valve 3 and be effective in conduit 20 and branch conduits 21 and 22.

When the vehicle is brought to a stop with the brakes applied and the accelerator released, fluid will be trapped in chamber 41 and at the rear of piston 57. If the motor is now stopped, the fluid will remain trapped but the brakes will be released as pump 1 ceases operation and due to its gear leakage, the pressure in the booster and conduits 20, 22 and 24 will drop to zero. With fluid remaining trapped in chamber 41, valve D will remain open. Thus when the engine is again started, the brakes will be automatically applied (without actuation of the brake pedal) by the booster if valve A is not open when the engine starts. Under these conditions the booster applies its full force as valve D cannot meter due to trapped fluid in bore 29.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system for use with a vehicle having wheels, an engine connected to drive at least some of the wheels, means between the engine and the driven wheels for permitting the engine to be operable without driving the vehicle and brakes for at least some of the wheels, a fluid pressure generator driven at all times by the engine when operating, a fluid pressure brake actuating system including an operator-controlled actuator, and means controlled by the fluid pressure developed in the fluid pressure brake actuating system when the actuator is actuated by the operator for causing the total fluid pressure generated by the generator to apply pressure to the actuator.

2. In a fluid pressure system for use with a vehicle having wheels, an engine connected to drive at least some of the wheels, means between the engine and the driven wheels for permitting the engine to be operable without driving the vehicle and brakes for at least some of the wheels, a fluid pressure generator driven by a member movable only when the vehicle is moving, a fluid pressure brake actuating system including an operator-controlled actuator, and means controlled by the fluid pressure developed in the fluid pressure brake actuating system when the actuator is actuated by the operator for causing the fluid pressure generated by the generator to apply pressure to the actuator, said last named means comprising a normally closed control valve, means for opening said valve by fluid pressure developed in the fluid pressure braking system, and means for closing said valve when there is a predetermined ratio between the generated fluid pressure applied to the actuator and the fluid pressure developed in the fluid pressure braking system.

3. In a fluid pressure system for use with a vehicle having wheels, an engine connected to drive at least some of the wheels, means between the engine and the driven wheels for permitting the engine to be operable without driving the vehicle and brakes for at least some of the wheels, a fluid pressure generator driven by the engine, a fluid pressure generator driven by a member movable only when the vehicle is moving, a fluid pressure brake actuating system including an operator-controlled actuator, and means for causing the fluid under pressure generated by either generator to apply pressure to the actuator only when the actuator is caused to be actuated by the operator to apply the brakes by the fluid pressure brake actuating system.

4. In a fluid pressure system for use with a vehicle having wheels, an engine connected to drive at least some of the wheels, means between the engine and the driven wheels for permitting the engine to be operable without driving the vehicle and brakes for at least some of the wheels, a fluid pressure generator driven by the engine, a fluid pressure brake actuating system including an operator-controlled actuator, means controlled by the fluid pressure developed in the fluid pressure brake actuating system when the actuator is actuated by the operator for causing the fluid pressure generated by the generator to apply pressure to the actuator, and manually-controlled means independent of the operator-controlled actuator for causing the fluid pressure generated by the generator to discontinue the application of pressure to the actuator and thereby permit release of the brakes.

5. In a fluid pressure system for use with a vehicle having wheels, an engine connected to drive at least some of the wheels, means between the engine and the driven wheels for permitting the engine to be operable without driving the vehicle and brakes for at least some of the wheels, a fluid pressure generator driven by a member movable only when the vehicle is moving, a fluid pressure brake actuating system including an operator-controlled actuator, means controlled by the fluid pressure developed in the fluid pressure brake actuating system when the actuator is actuated by the operator for causing the fluid pressure generated by the generator to apply pressure to the actuator, and manually-controlled means independent of the operator-controlled actuator for causing the fluid pressure generated by the generator to discontinue the application of pressure to the actuator and thereby permit release of the brakes.

6. In a fluid pressure system for use with a vehicle provided with a propelling engine having an accelerator mechanism, with a torque transmitting connection between the engine and the wheels and with a fluid pressure brake actuating system including an operator-controlled actuator, a fluid pressure generator driven by the engine, means controlled by the fluid pressure developed in the fluid pressure brake actuating system when the actuator is actuated by the operator for causing the fluid pressure generated by the generator to apply pressure to the actuator, and means operable by the accelerator mechanism when in a released position for causing the fluid pressure generated by the generator to discontinue the application of pressure to the actuator and thereby permit release of the brakes.

7. In a fluid pressure system for use with a vehicle provided with a propelling engine having an accelerator mechanism, with a torque transmitting connection between the engine and the wheels and with a fluid pressure brake actuating system including an operator-controlled actuator, a fluid pressure generator connected to be driven by the torque transmitting connection only when the wheels are moving, means controlled by the fluid pressure developed in the fluid pressure brake actuating system when the actuator is actuated by the operator for causing the fluid pressure generated by the generator to apply pressure to the actuator, and means operable by the accelerator mechanism when moved from a released position for causing the fluid pressure generated by the generator to discontinue the application of pressure to the actuator and thereby permit release of the brakes.

8. In a fluid pressure system for use with a vehicle provided with a propelling engine having an accelerator mechanism, with a torque transmitting connection between the engine and the wheels and with a fluid pressure brake actuating system including an operator-controlled actuator, a fluid pressure generator driven by the engine, a fluid pressure generator connected to be driven by the transmitting connection only when the wheels are moving, means controlled by the fluid pressure developed in the fluid pressure brake actuating system when the actuator is actuated by the operator for causing the fluid pressure generated by either generator to apply pressure to the actuator, and means operable by the accelerator mechanism when in a released position for causing the fluid pressure generated by the generator to discontinue the application of pressure to the actuator and thereby permit release of the brakes.

9. In a fluid pressure system for use with a vehicle provided with a propelling engine having an accelerator mechanism, with a torque transmitting connection between the engine and the wheels and with a fluid pressure brake actuating system including a master cylinder and operator-controlled actuating means therefor, a fluid pressure generator driven by the engine, a fluid motor for applying pressure to the master cylinder in addition to that of the operator-controlled actuating means therefor, conduit means between the generator and the motor, a valve for said conduit means, means for opening said valve by fluid pressure developed in the fluid pressure brake actuating system when the master cylinder is operated by the operator-controlled actuating means, means for holding said valve open notwithstanding release of fluid pressure in the brake actuating system, and valve means controlled by the accelerator mechanism when moved to a depressed position for permitting the fluid pressure developed by the generator to prevent said holding means from being operable.

10. In a fluid pressure system for use with a vehicle provided with a propelling engine having an accelerator mechanism, with a torque transmitting connection between the engine and the wheels and with a fluid pressure brake actuating system including a master cylinder and operator-controlled actuating means therefor, a fluid pressure generator driven by the engine, a second fluid pressure generator connected to be driven by the transmitting connection only when the wheels are moving, a fluid motor for applying pressure to the master cylinder in addition to that of the operator-controlled actuating means therefor, conduit means between both generators and the motor, a valve for said conduit means, means for opening said valve by fluid pressure developed in the fluid pressure brake actuating system when the master cylinder is operated by the operator-controlled actuating means, means for holding said valve open notwithstanding release of fluid pressure in the brake actuating system, means controlled by fluid pressure developed by the second generator when operating for preventing said holding means from being operable, and valve means controlled by the accelerator mechanism when moved to a depressed position for permitting the fluid pressure developed by the first generator to also prevent said holding means from being operable.

11. In a fluid pressure system for use with a vehicle provided with a propelling engine, with a torque transmitting connection between the engine and the wheels including means for permitting the engine to be operable without driving the vehicle and with a fluid pressure brake actuating system including a master cylinder and operator-controlled actuating means therefor, a fluid pressure generator driven by the engine, a second fluid pressure generator connected to be driven by the transmitting connection only when the wheels are moving, a fluid motor for applying pressure to the master cylinder in addition to that of the operator-controlled actuating means therefor, conduit means between both generators and the motor, a valve for said conduit means, means for opening said valve by fluid pressure developed in the fluid pressure brake actuating system when the master cylinder is operated by the operator-controlled actuating means, means for holding said valve open notwithstanding release of fluid pressure in the brake actuating system, and means controlled by fluid pressure developed by the second generator when operating for preventing said holding means from being operable.

12. In a fluid pressure system for use with a vehicle provided with a propelling engine, with a torque transmitting connection between the engine and the wheels including means for permitting the engine to be operable without driving the vehicle and with a fluid pressure brake actuating system including a master cylinder and operator-controlled actuating means therefor, a fluid pressure generator driven by the engine, a second fluid pressure generator connected to be driven by the transmitting connection only when the wheels are moving, a fluid motor for applying pressure to the master cylinder in addition to that of the operator-controlled actuating means therefor, conduit means between both generators and the motor, a valve for said conduit means, a fluid motor and conduit means for opening said valve by fluid pressure developed in the fluid pressure brake actuating system when the master cylinder is operated by the operator-controlled actuating means, spring-controlled valve means for trapping fluid in the last named fluid motor to thereby hold the valve controlled thereby open, and means for holding the spring-controlled valve open by fluid pressure developed by the second generator when operating.

13. In a fluid pressure system for use with a vehicle provided with a propelling engine and with a fluid pressure brake actuating system including a master cylinder and operator-controlled actuating means therefor, a fluid pressure generator driven by the engine, a fluid motor for applying pressure to the master cylinder in addition to that of the operator-controlled actuating means, conduit means between said generator and the motor, a normally closed valve for said conduit means, means including a second normally open valve for connecting said motor to a sump, a fluid motor for opening said first named valve and closing said second named valve, means for operating said last named fluid motor by fluid pressure developed in the fluid pressure brake actuating system when the master cylinder is operated by the operator-controlled actuating means, and means for trapping fluid pressure in the last named motor in order to maintain said valves so conditioned that the fluid pressure developed by the generator will continue to be effective in the first named motor to thereby maintain the brakes in applied condition notwithstanding the operator-controlled means is released.

14. In a fluid pressure system for use with a vehicle provided with a propelling engine and with a fluid pressure brake actuating system including a master cylinder and operator-controlled actuating means therefor, a fluid pressure generator driven by the engine, a fluid motor for applying pressure to the master cylinder in addition to that of the operator-controlled actuating means, conduit means between said generator and the motor, a normally closed valve for said conduit means, means including a second normally open valve for connecting said motor to a sump, a fluid motor for opening said first named valve and closing said second named valve, means for operating said last named fluid motor by fluid pressure developed in the fluid pressure brake actuating system when the master cylinder is operated by the operator-controlled actuating means, means for trapping fluid pressure in the last named motor in order to maintain said valves so conditioned that the fluid pressure developed by the generator will continue to be effective in the first named motor to thereby maintain the brakes in applied condition notwithstanding the operator-controlled means is released, and manually-controlled means for releasing said trapped fluid pressure in the second motor.

15. In a fluid pressure system for use with a vehicle provided with a propelling engine, with a torque transmitting connection between the engine and the wheels and with a fluid pressure brake actuating system including a master cylinder and operator-controlled actuating means therefor, a fluid pressure generator connected to be driven by the transmitting connection only when the wheels are moving, a fluid motor for applying pressure to the master cylinder in addition to that of the operator-controlled actuating means, conduit means between said generator and the motor, a normally closed valve for said conduit means, means including a second normally open valve for connecting said motor to a sump, a fluid motor for opening said first named valve and closing said second named valve, means for operating said last named fluid motor by fluid pressure developed in the fluid pressure brake actuating system when the master cylinder is operated by the operator-controlled actuating means, and means operable by fluid pressure being developed by the generator for causing said first named valve to become closed and the second named valve to be open when the operator-controlled actuating means is released to decrease the fluid pressure on the second fluid motor.

16. In a fluid pressure system for use with a vehicle provided with a propelling engine and with a fluid pressure brake actuating system including a master cylinder and operator-controlled actuating means therefor, a fluid pressure generator driven by the engine, a fluid motor for applying pressure to the master cylinder in addition to that of the operator-controlled actuating means, means comprising valve means for connecting the generator to the motor, means for opening said valve means by the fluid pressure developed in the fluid pressure brake actuating system when the master cylinder is operated by the operator-controlled actuating means, means operable by the fluid pressure from the generator for closing said valve means when the operator-controlled actuating means is released, means for preventing said valve means from being closed by the valve closing means, and manually-controlled means for causing said last named preventing means to be inoperative.

17. In a fluid pressure system for use with a vehicle provided with a propelling engine having an accelerator mechanism and with a fluid pressure brake actuating system including a master cylinder and operator-controlled actuating means therefor, a fluid pressure generator driven by the engine, a fluid motor for applying pressure to the master cylinder in addition to that of the operator-controlled actuating means, means comprising valve means for connecting the generator to the motor, means for opening said valve means by the fluid pressure developed in the fluid pressure brake actuating system when the master cylinder is operated by the operator-controlled actuating means, means operable by the fluid pressure from the generator for closing said valve means when the operator-controlled actuating means is released, means for preventing said valve means from being closed by the valve closing means, a fluid motor for causing said last named means to be inoperative, and valve means controlled by depressing the accelerator mechanism for causing the last named fluid motor to be operated by fluid pressure developed by the generator.

18. In a fluid pressure system for use with a vehicle provided with a propelling engine and with a fluid pressure brake actuating system including a master cylinder and operator-controlled actuating means therefor, a fluid pressure generator driven by the engine, a fluid motor for applying pressure to the master cylinder in addition to that of the operator-controlled actuating means, means comprising valve means for connecting the generator to the motor, means for opening said valve means by the fluid pressure developed in the fluid pressure brake actuating system when the master cylinder is operated by the operator-controlled actuating means, means operable by the fluid pressure from the generator for closing said valve means when the operator-controlled actuating means is released, means for preventing said valve means from being closed by the valve closing means, and means for causing said last named preventing means to be inoperative when the vehicle is moving.

19. In a fluid pressure system for use with a vehicle provided with a propelling engine having an accelerator mechanism and with a fluid pressure brake actuating system including operator-controlled actuating means therefor, a fluid pressure generator driven by the engine, means for causing the fluid pressure developed by the generator to be effective to apply pressure to the brake actuating means only when said brake actuating means is operated by the operator and to maintain said effective pressure notwithstanding the actuating means for the brakes is subsequently released by the operator, and means for causing the fluid pressure developed by the generator to become ineffective in maintaining pressure on the actuating means of the braking system when the accelerator mechanism is in a depressed condition and the actuating means of the braking system continues to be released by the operator.

STEVE SCHNELL.